(12) United States Patent
Milliken

(10) Patent No.: US 6,978,223 B2
(45) Date of Patent: Dec. 20, 2005

(54) SYSTEMS AND METHODS FOR NETWORK PERFORMANCE MEASUREMENT USING PACKET SIGNATURE COLLECTION

(75) Inventor: Walter Clark Milliken, Dover, NH (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 10/234,554

(22) Filed: Sep. 4, 2002

(65) Prior Publication Data
US 2003/0046388 A1 Mar. 6, 2003

Related U.S. Application Data

(60) Provisional application No. 60/317,662, filed on Sep. 6, 2001, provisional application No. 60/337,749, filed on Nov. 8, 2001.

(51) Int. Cl.[7] .............................................. G01N 19/00
(52) U.S. Cl. ..................... 702/182; 702/122; 702/189
(58) Field of Search ............................... 702/122, 182, 702/189; 709/200–203, 217, 224, 235, 231, 709/233, 229; 370/235, 241, 252, 253, 234, 370/233, 217, 224; 714/4

(56) References Cited

U.S. PATENT DOCUMENTS

| | | | |
|---|---|---|---|
| 5,101,402 A * | 3/1992 | Chiu et al. .................. | 709/224 |
| 5,197,127 A * | 3/1993 | Waclawsky et al. ........ | 709/224 |
| 5,343,465 A * | 8/1994 | Khalil ......................... | 370/232 |
| 5,570,346 A * | 10/1996 | Shur .......................... | 370/231 |
| 5,689,566 A * | 11/1997 | Nguyen ...................... | 713/155 |
| 5,761,531 A | 6/1998 | Ohmura et al. | |
| 5,765,030 A | 6/1998 | Nachenberg et al. | |
| 5,959,976 A | 9/1999 | Kuo | |
| 6,038,233 A | 3/2000 | Hamamoto et al. | |
| 6,115,393 A * | 9/2000 | Engel et al. ................ | 370/469 |
| 6,138,254 A | 10/2000 | Voshell | |
| 6,223,172 B1 | 4/2001 | Hunter et al. | |
| 6,363,429 B1 * | 3/2002 | Ketcham .................... | 709/235 |
| 6,363,477 B1 * | 3/2002 | Fletcher et al. ............ | 713/151 |
| 6,389,419 B1 | 5/2002 | Wong et al. | |
| 6,397,259 B1 | 5/2002 | Lincke et al. | |
| 6,424,650 B1 | 7/2002 | Yang et al. | |
| 6,438,612 B1 | 8/2002 | Ylonen et al. | |
| 6,609,205 B1 * | 8/2003 | Bernhard et al. .......... | 713/201 |
| 6,643,259 B1 * | 11/2003 | Borella et al. ............. | 370/231 |
| 6,662,230 B1 | 12/2003 | Eichstaedt et al. | |

(Continued)

FOREIGN PATENT DOCUMENTS

WO  WO 00/28420  5/2000

OTHER PUBLICATIONS

U.S. Appl. No. 09/881,145, filed Jun. 14, 2001, Partridge et al.

(Continued)

Primary Examiner—Carol S. W. Tsai
(74) Attorney, Agent, or Firm—Fish & Neave IP Group Ropes & Gray LLP (57) ABSTRACT

A system for measuring network performance parameters includes multiple network nodes (125) and at least one collection agent (130). Each of the multiple network nodes (125) calculates signature values for received packets. Each of the signature values includes an identifier for a corresponding packet. The collection agent (130) collects the signature values from the multiple network nodes (125), and determines one or more network performance parameters based on the collected signature values and network topology information.

28 Claims, 10 Drawing Sheets

U.S. PATENT DOCUMENTS

| | | | |
|---|---|---|---|
| 6,678,250 B1 * | 1/2004 | Grabelsky et al. | 370/241 |
| 6,707,915 B1 | 3/2004 | Jobst et al. | |
| 6,842,861 B1 | 1/2005 | Cox et al. | |
| 2002/0152384 A1 * | 10/2002 | Shelest et al. | 713/176 |
| 2002/0177910 A1 * | 11/2002 | Quarterman et al. | 700/28 |
| 2003/0061502 A1 | 3/2003 | Teblyashkin et al. | |
| 2003/0086422 A1 * | 5/2003 | Klinker et al. | 370/389 |

OTHER PUBLICATIONS

U.S. Appl. No. 09/881,074, filed Jun. 14, 2001, Sanchez et al.

U.S. Appl. No. 10/044,073, filed Jan. 11, 2002, Milliken et al.

Alex C. Snoeren et al., Hash-Based IP Traceback, SIGCOMM '01, Aug. 27-31, 2001, San Diego, CA, 12 Pages.

Todd Heberlein; "Worm Detection and Prevention: Concept, Approach, and Experience"; Net Squared, Inc.; http://www.attackcenter.com/Information/WhitePapers/WormDetect/; Aug. 14, 2002; pp. 1-7.

S. Staniford-Chen, and L. Todd Herberlein; "Holding Intruders Accountable on the Internet"; Proceedings of the 1995 IEEE Symposium on Security and Privacy; Oakland, CA, pp. 39-49, May 8-10, 1995.

* cited by examiner

PACKET SIGNATURE RECORDS
405

| SIGNATURE RECORD ENTRIES 500 | PACKET SIGNATURE VALUE 505 | TIME STAMP 510 | DESTINATION IP PREFIX 515 |
|---|---|---|---|
| | SIG_VALUE_1 | TIME_STAMP_1 | IP_PREFIX_1 |
| | SIG_VALUE_2 | TIME_STAMP_2 | IP_PREFIX_2 |
| | SIG_VALUE_3 | TIME_STAMP_3 | IP_PREFIX_3 |

| SIGNATURE RECORD ENTRIES 800 | NETWORK NODE IDENTIFIER 805 | PACKET SIGNATURE VALUE 505 | TIME STAMP 510 | DESTINATION IP PREFIX 515 |
|---|---|---|---|---|
| | NODE ID_1 | SIG_VALUE_1 | TIME_STAMP_1 | IP_PREFIX_1 |
| | NODE ID_2 | SIG_VALUE_2 | TIME_STAMP_2 | IP_PREFIX_2 |
| | NODE ID_3 | SIG_VALUE_3 | TIME_STAMP_3 | IP_PREFIX_3 |

COLLECTED PACKET SIGNATURE RECORDS 705

SYSTEMS AND METHODS FOR NETWORK PERFORMANCE MEASUREMENT USING PACKET SIGNATURE COLLECTION

CROSS REFERENCE TO RELATED APPLICATIONS

The instant application claims priority from provisional application No. 60/317,662, filed Sep. 6, 2001, and provisional application No. 60/337,749, filed Nov. 8, 2001, the disclosures of which is incorporated by reference herein in their entirety.

The present application relates to co-pending application Ser. No. 10/044,073, entitled "Systems and Methods for Point of Ingress Traceback of a Network Attack," filed on Jan. 11, 2002; co-pending application Ser. No. 09/881,145, entitled "Method and Apparatus for Identifying a Packet," filed on Jun. 14, 2001; and co-pending application Ser. No. 09/881,074, entitled "Method and Apparatus for Tracing Packets," filed on Jun. 14, 2001, each of which is hereby incorporated by reference in its entirety.

FIELD OF THE INVENTION

The present invention relates generally to communications networks and, more particularly, to systems and methods for passively measuring performance characteristics of communications networks.

BACKGROUND OF THE INVENTION

Conventional network performance monitoring techniques fall into two categories: passive and active. Passive techniques involve examination of existing network traffic and include packet and byte counts for packets matching various criteria, and packet length histograms and stateful measurements such as average packet and data rate measurements. Active techniques involve modifying existing packet traffic, or injecting test traffic from one measurement device addressed to another measurement device, and including enough information in the test packets to extract useful measurements. A common example of an active technique is the "ping" program, which sends an ICMP Echo Request to a remote system, and processes the reply. Such packets typically include the sender's time of transmission, and allow the measurement of loss rates, average end-to-end network transit delay, and delay variance ("jitter").

A major drawback to active measurement techniques is that such techniques consume network bandwidth—often considerable fractions of the link bandwidth, if highly-accurate results are desired over a relatively short timescale. The bandwidth consumed is, thus, not available to actual user traffic—i.e., it is often seen as wasted, except when actual network performance problems are present. Also, congestion is a common source of network performance problems (too much traffic at one or more points in the network), and sending active measurement packets at such times only worsens the congestion. In addition, there is no guarantee that test traffic will be treated by the network like normal user traffic. This might be due to either normal network packet-classification behavior, or deliberate attempts by the network operator to bias performance tests in its favor.

Passive network measurements techniques, thus, may be more desirable since they do not impact the network as a whole and do not consume otherwise usable bandwidth. Passive network measurement techniques also operate on actual user traffic and, thus, give a more accurate picture of the user's experience on the network. Passive techniques, however, are usually limited to measurements taken at a single point, since there has been no easy way to correlate appearances of the same packet at different places in the network. A conventional technique of this sort involves the collection of "packet traces" at multiple points in the network. These "packet traces" include logs of every packet header seen at that point, with an associated time stamp taken from a global clock source (e.g., a GPS receiver). Packet traces require storing about 100–200 bits from every packet, depending on the intended use. On a high bandwidth link, packet traces typically require huge amounts of storage (e.g., gigabyte disk drives), often with high bandwidth interfaces. For example, a 1 Gb/s interface will typically require a 500 Mb/s trace-collection storage device that, in turn, usually requires a special, high performance disk. Also, trace collection storage usually fills up rapidly, and takes a long time to transfer to a central repository (usually over the network itself, thus using a lot of network bandwidth). Therefore, packet traces generally cover only a few seconds to a few minutes of time, and are rarely taken more than a few times per day.

Therefore, there exists a need for systems and methods that can passively monitor network performance characteristics without requiring large amounts of storage and without using excessive amounts of network bandwidth.

SUMMARY OF THE INVENTION

Systems and methods consistent with the present invention address this and other needs by providing mechanisms for calculating signatures of packets at selected nodes of a network. The calculated signatures may include substantially fewer bits than the packet or packet header and, thus, require relatively small amounts of storage capacity. The substantially fewer bits of the calculated signatures further require relatively small amounts of network bandwidth when sent across the network to one or more collection agents. By correlating the packet signatures collected from the nodes of the network, the collection agent(s) can determine network performance parameters, such as, for example, end-to-end delay, delay variance, or packet loss rates.

In accordance with the purpose of the invention as embodied and broadly described herein, a method of measuring network performance parameters includes calculating signature values for packets received at one or more nodes in the network, each of the signature values comprising an identifier for a corresponding packet. The method further includes collecting the signature values from the one or more nodes to obtain collected signature values and determining one or more network performance parameters based on the collected signature values and network topology information.

In a further implementation consistent with the present invention, a method of measuring a packet loss rate across a network includes determining first packet signatures of packets entering the network and determining second packet signatures of packets leaving the network. The method further includes comparing the determined first and second packet signatures to identify packets entering the network that do not leave the network and determining the packet loss rate based on the comparison.

In another implementation consistent with the present invention, a method of measuring network performance parameters includes receiving packet signatures of packets received at a group of nodes in a network, where the packet signatures are calculated at the group of nodes. The method further includes correlating appearances of identical ones of the packets among the group of nodes using the calculated packet signatures to obtain correlated appearances and determining temporal behavior of packet traffic between the group of nodes based on the correlated appearances to obtain determined temporal behavior. The method additionally includes determining network performance parameters based on the determined temporal behavior.

In a further implementation consistent with the present invention, a method of logging packet signatures at a node in network includes calculating signature values for packets received at the node, each of the signature values comprising an identifier for a corresponding packet. The method further includes timestamping each of the received packets to produce a timestamp value associated with each packet and logging the calculated signature values and the timestamp values. The method additionally includes sending a group of the calculated signature values and associated time stamps to a collection agent across the network.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide mechanisms for determining network performance parameters, such as, for example, end-to-end delay, delay variance, or packet loss rates. Multiple nodes of a network can be equipped with packet signature recorders that calculate and store packet signatures for the packets received at each node. The algorithms used to produce the packet signatures may include hashing algorithms (e.g., MD5 message digest algorithm, secure hash algorithm (SHS), RIPEMD-160), message authentication codes (MACs), and Cyclical Redundancy Checking (CRC) algorithms, such as CRC-32. The signature values of each received packet may be stored in memory and forwarded to a collection agent for network performance analysis. The collection agent may correlate appearances of packets at the nodes of the network, using the collected packet signatures, to determine the network performance parameters.

EXEMPLARY NETWORK

Figure 1:
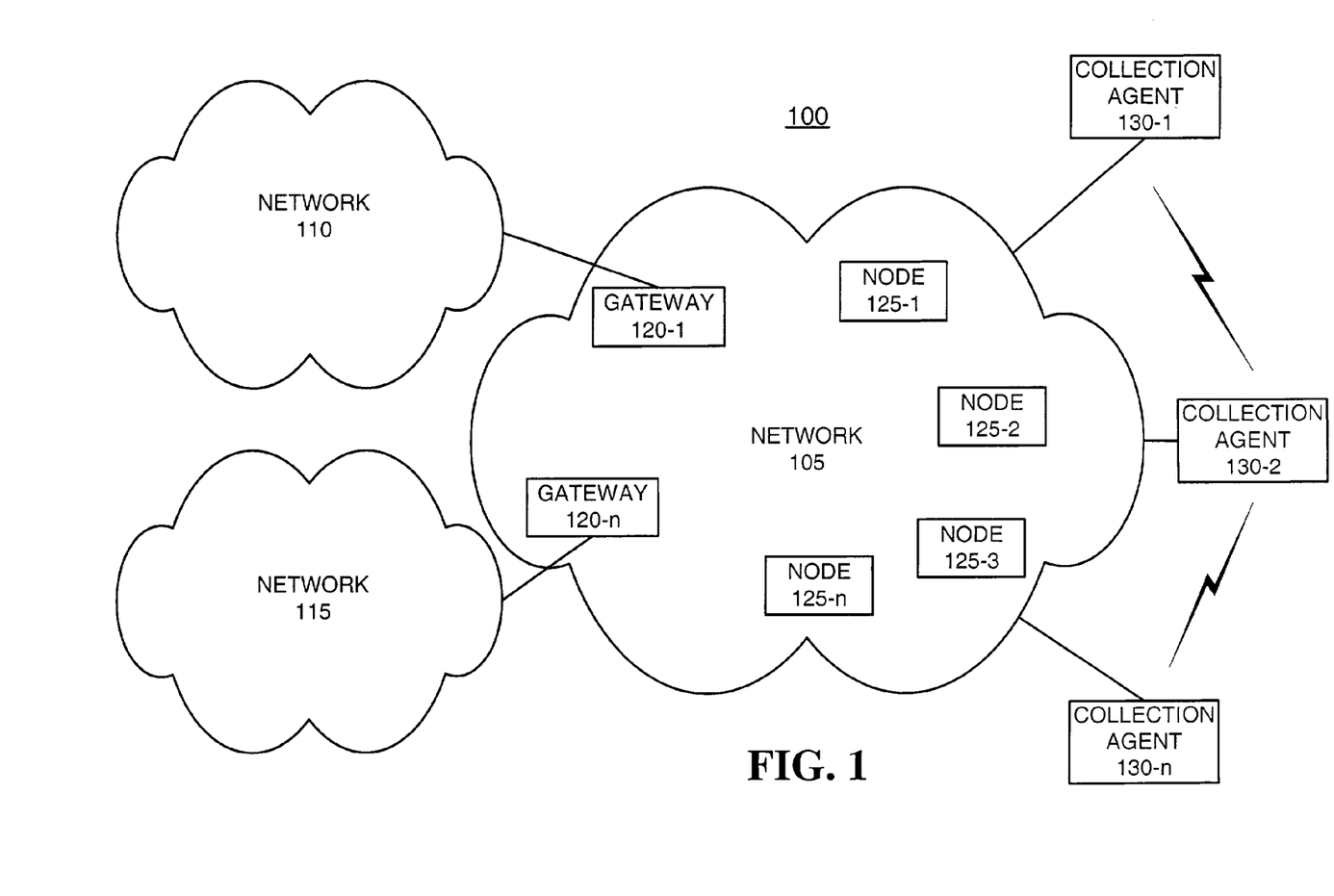
FIG. 1 illustrates an exemplary network in which systems and methods, consistent with the present invention, may be implemented.

FIG. 1 illustrates an exemplary network 100 in which systems and methods, consistent with the present invention, may operate to passively measure network performance parameters using packet signatures calculated at specific network nodes. Network 100 may include a sub-network 105 interconnected with other sub-networks 110 and 115 via respective gateways 120. Network 100 may further include one or more collection agents 130 that interconnect with sub-network 105 and monitor traffic between network nodes 125-1 through 125-n and gateways 120-1 through 120-n. Collection agents 130 may connect with sub-network 105 via wired, wireless or optical connection links (not shown). In some exemplary embodiments, the functions associated with collection agents 130 may be distributed among nodes 125. Sub-networks 105, 110 and 115 can include one or more networks of any type, including a local area network (LAN), metropolitan area network (MAN), wide area network (WAN), Internet, or Intranet. Network nodes 125-1 through 125-n may include routers, bridges or the like, for routing data through sub-network 105. Gateways 120 route data from sub-network 105 to sub-networks 110 and 115.

EXEMPLARY NETWORK NODE/GATEWAY CONFIGURATION

Figure 2:
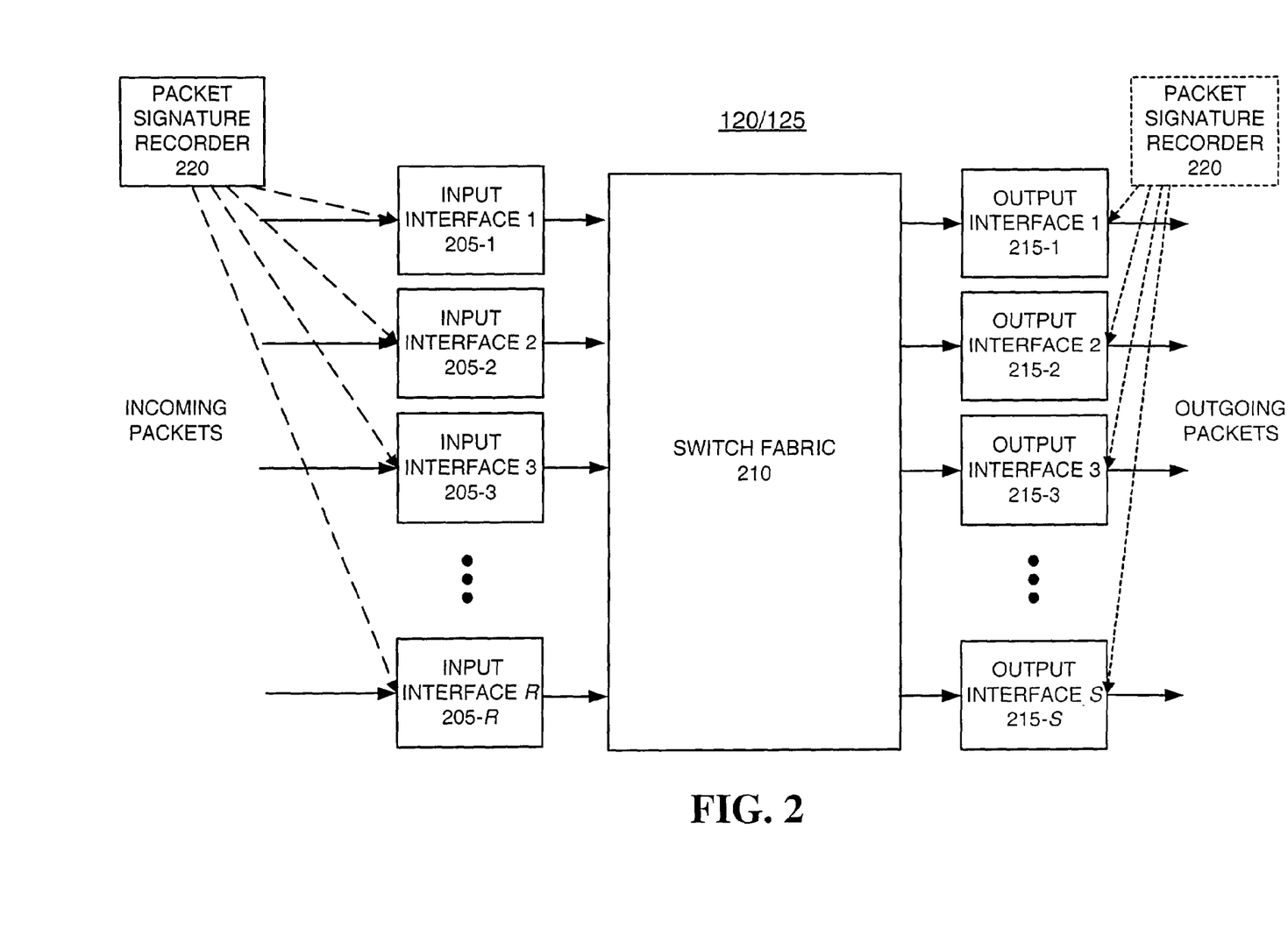
FIG. 2 illustrates exemplary components of a network node/gateway that includes a packet signature recorder consistent with the present invention.

FIG. 2 illustrates exemplary components of a network node 125 consistent with the present invention. Gateways 120 may be similarly configured. In general, network node 125 receives incoming packets, determines the next destination (the next "hop" in sub-network 105) for the packets, and outputs the packets as outbound packets on links that lead to the next destination. In this manner, packets "hop" from node to node in sub-network 105 until reaching their final destination.

As illustrated, node 125 may include multiple input interfaces 205-1 through 205-R, a switch fabric 210, multiple output interfaces 215-1–215-S, and a packet signature recorder 220 (where R may not be equal to S). Each input interface 205 of node 125 may further include routing tables and forwarding tables (not shown). Through the routing tables, each input interface 205 may consolidate routing information learned from the routing protocols of the network. From this routing information, the routing protocol process may determine the active route to network destinations, and install these routes in the forwarding tables. Each input interface may consult a respective forwarding table when determining a next destination for incoming packets.

In response to consulting a respective forwarding table, each input interface 205 may either set up switch fabric 210 to deliver a packet to its appropriate output interface 215, or attach information to the packet (e.g., output interface number) to allow switch fabric 210 to deliver the packet to the appropriate output interface 215. Each output interface 215 may queue packets received from switch fabric 210 and transmit the packets on to a "next hop."

Packet signature recorder 220 may include mechanisms for computing a signature of each packet received at an input interface 205, or output interface 215, and storing each computed signature in a memory (not shown). Packet signature recorder 220 may use any technique for computing the signature of each incoming packet that produces a value that is likely to be unique across a very large number of packets. Such techniques may include hashing algorithms (e.g., MD5 message digest algorithm, secure hash algorithm (SHS), RIPEMD-160), message authentication codes (MACs), or Cyclical Redundancy Checking (CRC) algorithms, such as CRC-32. The computed signatures for each incoming packet, thus, represent "hashes" that should be fairly pseudo-random relative to the incoming packet.

Packet signature recorder 220 may be internal or external to node 125. The internal packet signature recorder 220 may be implemented as an interface card plug-in to a conventional switching background bus (not shown). The external packet signature recorder 220 may be implemented as a separate auxiliary device connected to the router through an auxiliary interface. The external packet signature recorder 220 may, thus, act as a passive tap on the node's input or output links.

EXEMPLARY PACKET SIGNATURE RECORDED

Figure 3:
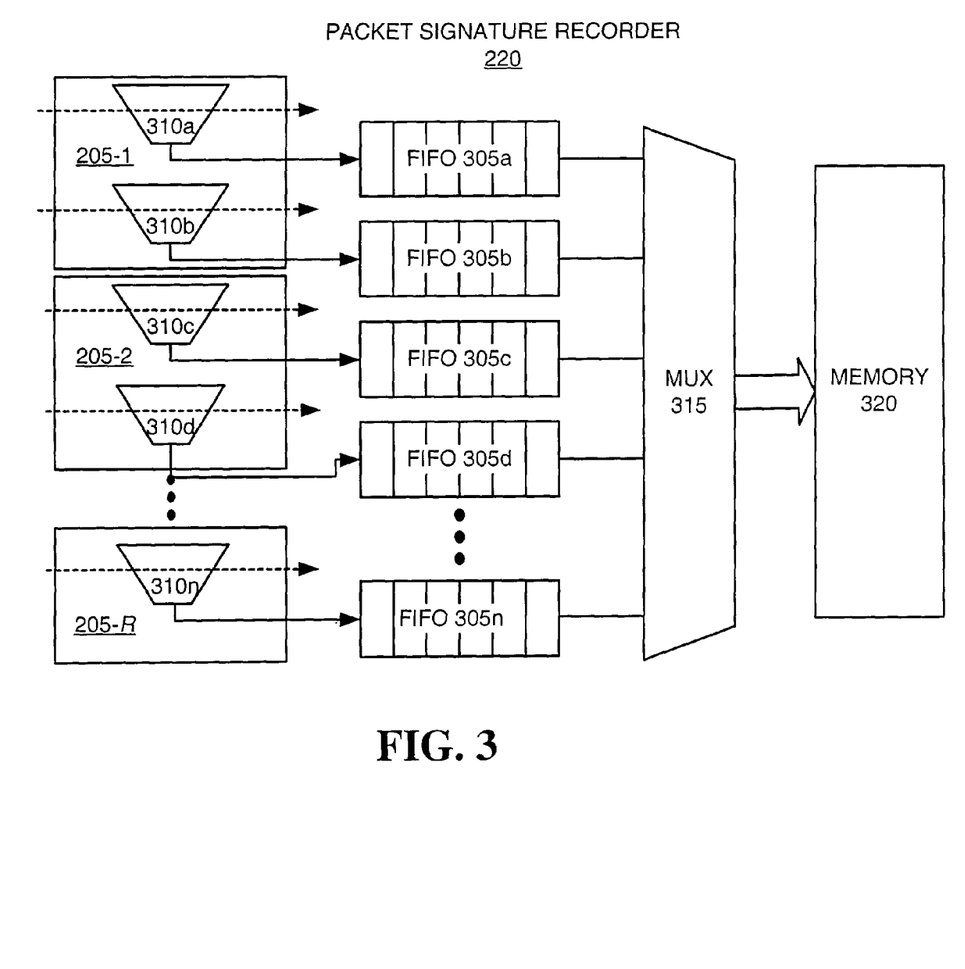
FIG. 3 illustrates exemplary components of a packet signature recorder consistent with the present invention.

FIG. 3 illustrates exemplary components of packet signature recorder 220 consistent with the present invention. Packet signature recorder 220 may include signature taps 310a-310n, first-in-first-out (FIFO) queues 305a-305n, a multiplexer (MUX) 315, and a memory 320.

Each signature tap 310a–310n may produce a signature of each packet received by a respective input interface 205-1-205-R (or, alternatively, a respective output interface 215-1-215-S). The signature typically comprises k bits, where each packet may include a number of p bits and k<p. FIFO queues 305a–605n may store packet signatures received from signature taps 310a–310n. MUX 315 may selectively retrieve packet signatures from FIFO queues 305a–305n and store the packet signatures, along with a time stamp, in memory 320. Memory 320 may include, for example, a small high-speed random access device, such as an SRAM.

The number of packet signature bits k needed for each packet may be dictated by the requirement that the packet signature value be highly likely to be unique among all packet signatures recorded in the network, over the average lifetime of a packet in the network (e.g., approximately on the order of 100 ms). While the probability of two packet signatures of length k bits colliding is 1 in $2^k$, each packet signature may be compared to N other packet signatures, where N may be assumed approximately equal to $2^k$. With N independent trials, each with a collision probability of $1/(2^k)$, the number of packet signature bits k should be set approximately equal to 2*log 2(N) to avoid significant packet signature collision (where "*" is a multiplication symbol). For a network such as the Internet, the number of packets N in the network at any instant can be estimated to be on the order of 10 Gb/s (e.g., approximate cross-section of the network's total bandwidth) divided by 1000 bits (e.g., the average size of an IP packet) multiplied by 100 ms (e.g., average lifetime of a packet in the network). This estimation equals 1 million. The number of packet signature bits per packet (k) must, therefore, be at least 2*log $2(10^6)$ (i.e., about 40 bits). This number of bits is substantially less than the number of bits in a typical packet header trace record.

EXEMPLARY PACKET SIGNATURE DATABASE

Figure 4:
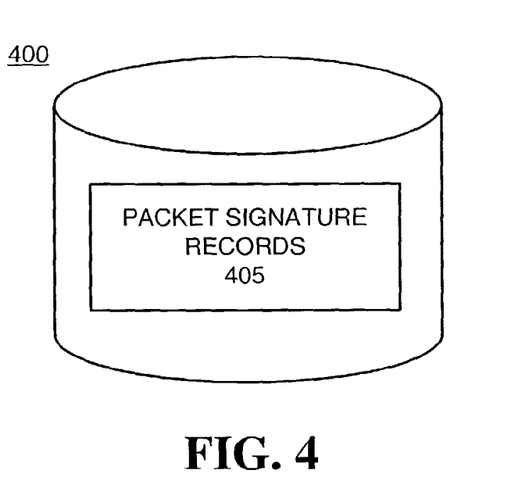
FIG. 4 illustrates an exemplary database associated with the packet signature recorder of FIG. 3 consistent with the present invention.

FIG. 4 illustrates an exemplary packet signature database 400 that may be stored in memory 320 of packet signature recorder 220 consistent with the invention. Database 400 may include packet signature records 405 that further include calculated signature values for packets received at a corresponding gateway 120 or network node 125.

Figure 5:
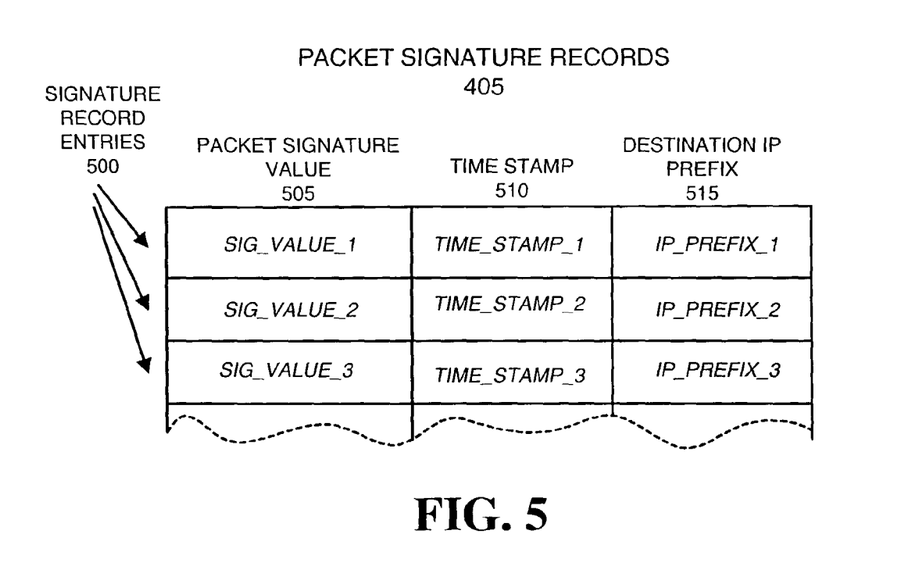
FIG. 5 illustrates exemplary packet signature records of the database of FIG. 4 consistent with the present invention.

FIG. 5 illustrates exemplary signature record entries 500 of packet signature records 405. Each signature record entry 500 may include a packet signature value 505, a time stamp 510 and an optional destination Internet Protocol (IP) prefix 515. Packet signature value 505 may include a signature of a corresponding packet computed by packet signature recorder 220. Time stamp 510 may include a global time stamp that corresponds to the arrival of the corresponding packet at the packet signature recorder 220. Time stamp 510 may, for example, be derived from a Global Positioning System (GPS) signal or from the Network Time Protocol (NTP). Destination IP prefix 515 may indicate the IP prefix of the destination node of the corresponding packet. The value recorded in destination IP prefix 515 may include a routing entry index for the IP prefix or a signature of the IP prefix and its mask value. Each signature record entry 500 may further be time-indexed, with each computed packet signature being placed in the entry 500 corresponding to a current time.

EXEMPLARY COLLECTION AGENT

Figure 6:
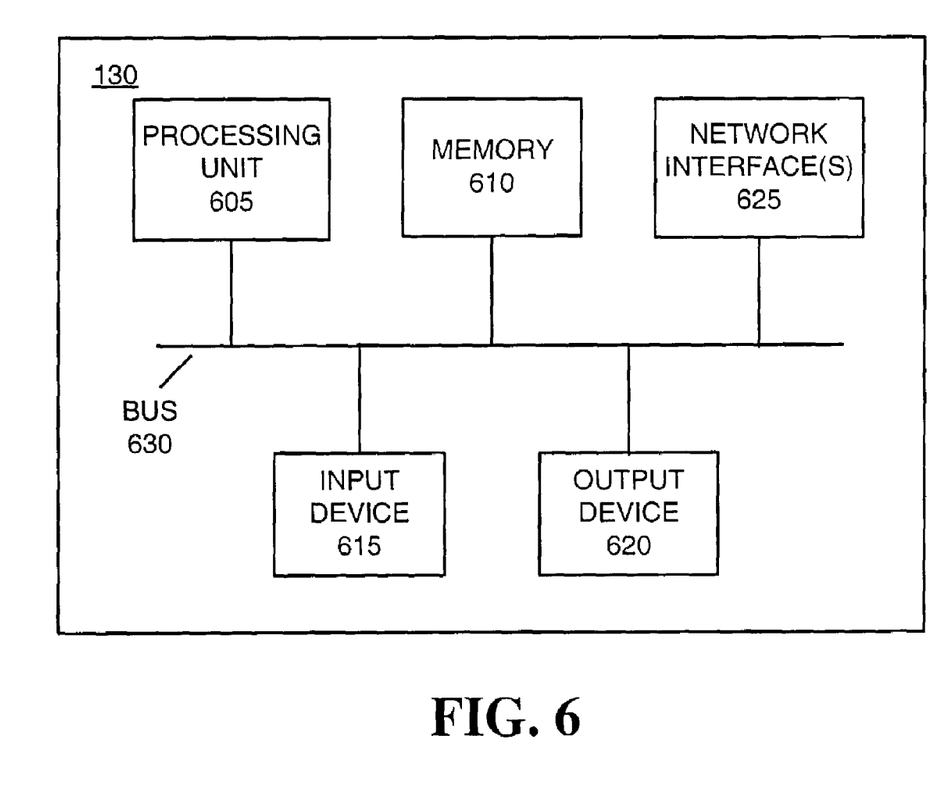
FIG. 6 illustrates exemplary components of a collection agent consistent with the present invention.

FIG. 6 illustrates exemplary components of a collection agent 130 (e.g., 130-1–130-N of FIG. 1) consistent with the present invention. Collection agent 130 may include a processing unit 605, a memory 610, an input device 615, an output device 620, network interface(s) 625 and a bus 630.

Processing unit 605 may perform all data processing functions for inputting, outputting, and processing of data. Memory 610 may include Random Access Memory (RAM) that provides temporary working storage of data and instructions for use by processing unit 605 in performing processing functions. Memory 610 may additionally include Read Only Memory (ROM) that provides permanent or semi-permanent storage of data and instructions for use by processing unit 605. Memory 610 can also include large-capacity storage devices, such as a magnetic and/or optical recording medium and its corresponding drive.

Input device 615 permits entry of user data into collection agent 130 and may include a user interface (not shown). Output device 620 permits the output of data in video, audio, or hard copy format. Network interface(s) 625 interconnect collection agent 130 with sub-network 105. Packets received from nodes 125 may be received via network interface(s) 625. Bus 630 interconnects the various components of collection agent 130 to permit the components to communicate with one another.

EXEMPLARY COLLECTED PACKET SIGNATURE DATABASE

Figure 7:
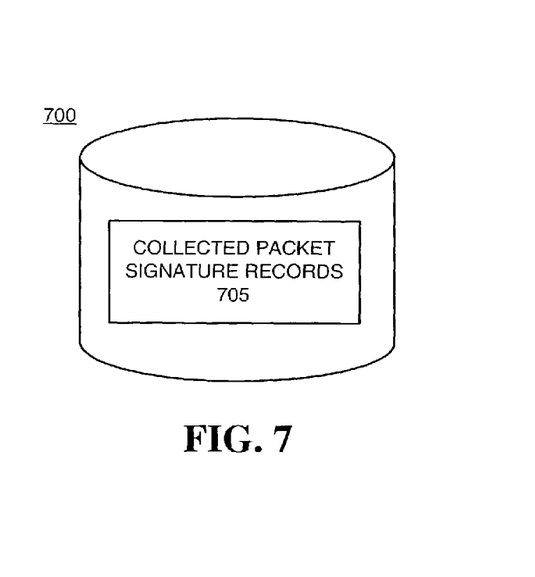
FIG. 7 illustrates an exemplary database associated with the collection agent of FIG. 6 consistent with the present invention.

FIG. 7 illustrates an exemplary collected packet signature database 700 that may be stored in memory 610 of collection agent 130 consistent with the invention. Database 700 may include collected packet signature records 705 that further include calculated signature values for packets received at a corresponding gateway 120 or network node 125.

Figure 8:
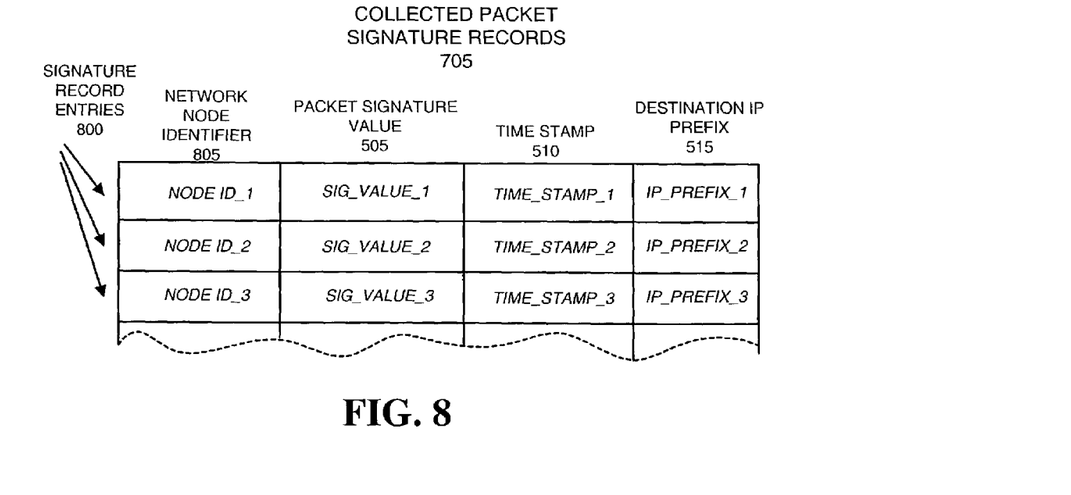
FIG. 8 illustrates exemplary collected packet signature records of the database of FIG. 7 consistent with the present invention.

FIG. 8 illustrates exemplary signature record entries 800 of collected packet signature records 705 consistent with the invention. Each signature record entry 800 may include a network node identifier 805, a packet signature value 505, a time stamp 510, and an optional destination Internet Protocol (IP) prefix 515. Network node identifier 805 may include, for example, a network address of the node 125 from which the packet signature value stored in packet signature value 505 was received.

EXEMPLARY PACKET SIGNATURE LOGGING PROCESS

Figure 9:
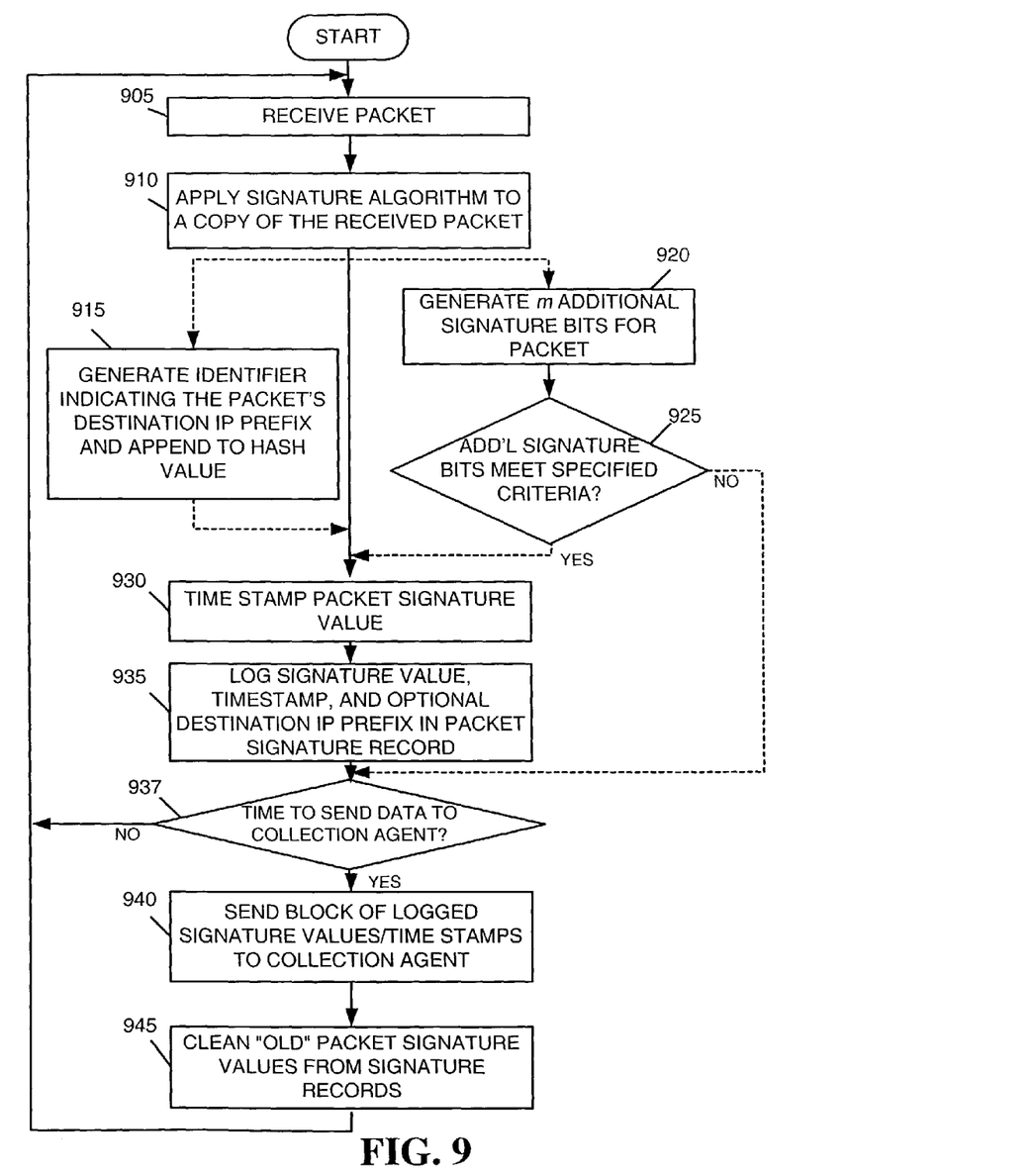
FIG. 9 is a flowchart that illustrates an exemplary packet signature logging process implemented at one or more network nodes consistent with the present invention.

FIG. 9 is a flowchart that illustrates an exemplary process, consistent with the present invention, for computing and logging packet signature values at network nodes 125 (or gateways 120) of sub-network 105 that are equipped with packet signature recorders 220. The process may begin with the reception of a packet at a packet signature recorder 220 [act 905]. A signature algorithm may then be applied to a copy of the received packet to produce a packet signature value [act 910]. For example, a hashing algorithm (e.g., MD5 message digest algorithm, secure hash algorithm (SHS), RIPEMD-160), a message authentication code (MACs), or a Cyclical Redundancy Checking (CRC) algorithm, such as CRC-32, may be applied to a copy of the received packet. Optionally, an identifier indicating the packet's destination IP prefix may be generated and appended to the packet signature value [act 915]. As another optional alternative, m additional signature bits may be generated for the packet [act 920]. To generate the m additional signature bits for each packet, an identical signature algorithm may be applied at all packet signature recorders 220 in sub-network 105. A determination may then be made whether the additional signature bits meet a specified criteria [act 925]. For example, a determination may be made whether the additional signature bits fall within a specified range. As another example, a determination may be made whether the additional signature bits equal a particular value (e.g., all zeros or all ones). If the additional signature bits do not meet the specified criteria, then the packet signature value may not be time stamped or logged, and the process may continue at act 937 below. If, however, the additional signature bits do meet the specified criteria, then the process may continue at act 930 below.

The packet signature value (along with optional destination IP prefix identifier) may be time stamped [act 930] and the packet signature value, timestamp, and optional destination IP prefix identifier may be logged as a signature record entry 500 in database 400 [act 935]. A determination may then be made whether it is time to send the data to a collection agent [act 937]. If it is not time to send data to the collection agent, the process returns to act 905 to receive another packet. In contrast, if it is determined that it is time to send data to a collection agent, then the process moves to act 940. A block that may include multiple signature record entries 500 may then be sent to one or more collection agents 130 [act 940]. The block of signature record entries 500 may be, for example, sent periodically to the collection agent(s) 130. The block of signature record entries 800 may include a time stamp for the whole block, with time stamp 510 of each record entry 800 including low order bits derived from a global time stamp (as described above) and high order bits derived from the time stamp for the whole block. "Old" signature record entries, as indicated by each timestamp value 510, may be cleaned from packet signature records 405 [act 945]. The "old" signature record entries may be, for example, cleaned from packet signature records 405 on a periodic basis.

Though, in some exemplary embodiments, packet signatures may be computed for every packet that arrives at gateways 120 or nodes 125, in other exemplary embodiments, only some fraction of arriving packets may have packet signatures computed. In such exemplary embodiments, the packet signatures may be computed uniformly across the gateways 120 and/or nodes 125 such that each gateway or node computes packet signatures for the same packets, or according to a same criteria. The exemplary process of FIG. 9, described above, may typically apply to unicast packets.

EXEMPLARY NETWORK PERFORMANCE MEASUREMENT PROCESS

Figure 10:
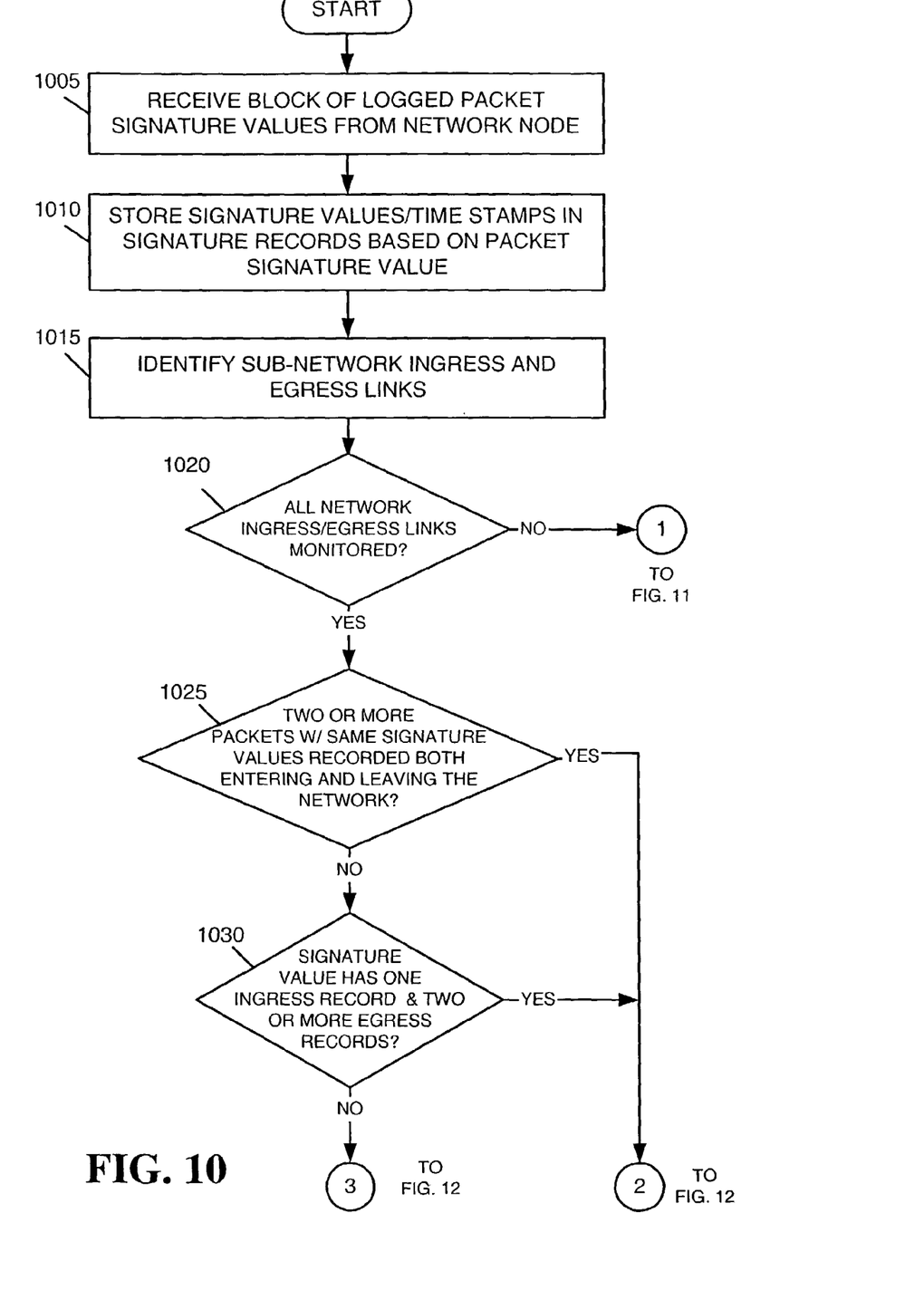
FIGS. 10–12 are flowcharts that illustrate an exemplary network performance monitoring process consistent with the present invention.
Figure 11:
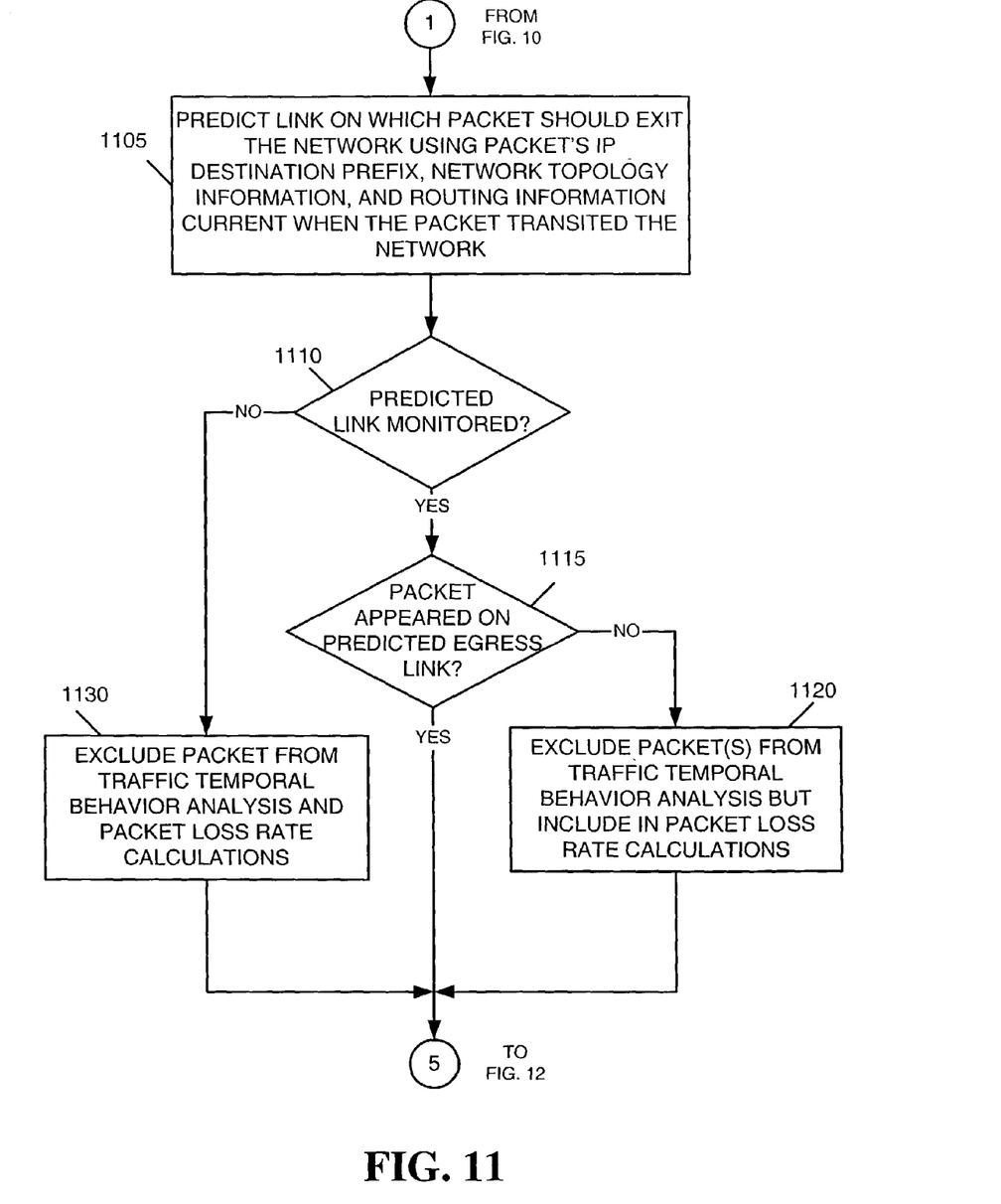
Figure 12:
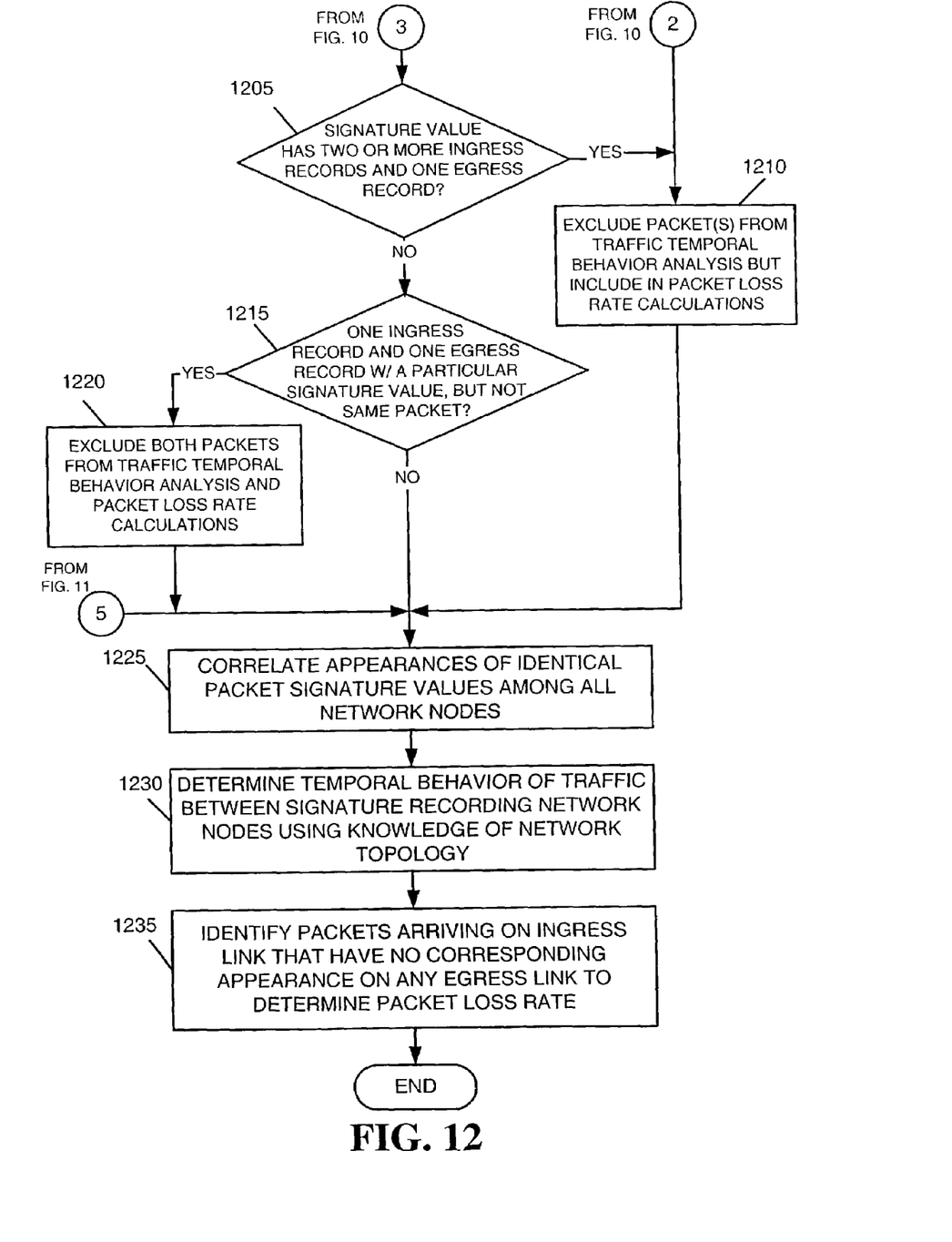

FIGS. 10–12 are flowcharts that illustrate an exemplary process, consistent with the present invention, for determining network performance parameters using packet signatures and associated time stamps collected from multiple nodes in the network. The process may begin with the receipt, at a collection agent 130, of a block of logged packet signature values/time stamps from a network node 125 (or gateway 120) of sub-network 105 [act 1005]. Each of the received packet signature values and associated time stamps may be stored as signature record entries 800 in collected packet signature records 705 [act 1010]. The ingress and egress links of sub-network 105 may then be identified [act 1015] using network topology information. For example, collection agent 130 may identify the link connecting gateway 120-1 to sub-network 110 as an ingress link, and the link connecting gateway 120-n to sub-network 115 as an egress link. A determination may then be made whether all network ingress and egress links are monitored by packet signature recorders 220 [act 1020]. If all network ingress and egress links are monitored by packet signature recorders 220, then the process may continue at act 1025 below.

If all network ingress and egress links are not monitored by packet signature recorders 220, then a link may be predicted on which any given packet should exit the network using the packet's IP destination prefix, network topology information, and routing information that was current when the packet transited the network [act 1105]. A determination may then be made whether the predicted link is monitored by a packet signature recorder 220 [act 1110]. If not, the packet may be excluded from traffic temporal behavior analysis and packet loss rate calculations [act 1130]. If the predicted link is monitored by a packet signature recorder 220, a determination may be made whether the packet appeared on the predicted egress link [act 1115]. If not, the packet may be assumed to be lost, and can be excluded from the traffic temporal behavior analysis, but included in packet loss rate calculations [act 1120]. If the packet does appear on the predicted egress link, the packet may be included in traffic temporal behavior analysis and packet loss calculations and the process may continue at act 1225 below.

Returning to FIG. 10, if all network ingress/egress links are monitored, a determination may be made whether two or more packets with the same packet signature values have been recorded both entering and leaving the network [act 1025]. If so, the two or more packets may be excluded from traffic temporal behavior analysis (see acts 1225–1235; FIG. 12), but included in packet loss rate calculations (see act 1235) [act 1210]. If not, a determination may be made whether any packet signature value has one ingress record and two or more egress records [act 1030]. If so, the packet corresponding to the packet signature value may be excluded from traffic temporal behavior analysis, but included in packet loss rate calculations. If no packet signature values have one ingress record and two or more egress records, a determination may further be made whether any packet signature value has two or more ingress records and one egress record [act 1205]. If so, the packet corresponding to the packet signature value may be excluded from traffic temporal behavior analysis, but included in packet loss rate calculations [act 1210].

If no packet signature values have two or more ingress records and one egress record, an additional determination may be made whether there is one ingress and one egress record with identical packet signature values, but the packet signature values correspond to different packets [act 1215]. This determination cannot be made from the packet signature values alone, but can be determined by temporal statistics derived from time stamp data. For example, the time stamp data may indicate that a given packet arrived at an egress link with a shorter delay than is possible on the shortest path between the ingress and egress links. The collection agent 130 may, thus, conclude that the packet signature values correspond to different packets. If this is the case, both packets may be excluded from traffic temporal behavior analysis and packet loss rate calculations [act 1220]. If not, the appearances of identical packet signature values may be correlated among all network nodes [act 1225]. The temporal behavior of traffic between signature recording network nodes may then be determined using stored knowledge of the network topology [act 1230]. For example, using packet signature matches, associated time stamp values, and network topology information, collection agent 130 may determine quality of service (QOS) parameters related to sub-network 105, such as, for example, end-to-end delay and delay variance ("jitter"). Packets arriving on an ingress link that have no corresponding appearance on any egress link may be identified to further determine a packet loss rate for sub-network 105 [act 1235].

CONCLUSION

Systems and methods consistent with the present invention, therefore, provide mechanisms that permit the determination of network performance parameters, such as, for example, end-to-end delay, delay variance, or packet loss rates. By equipping multiple nodes of a network with packet signature recorders, signatures of packets received at each node can be calculated and stored for forwarding to a collection agent for analysis. The collection agent may correlate appearances of packets at the nodes of the network, using the collected packet signatures, to determine the network performance parameters.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Also, while series of acts have been described with regard to FIGS. 9–12, the order of the acts may vary in other implementations consistent with the present invention. Also, non-dependent acts may be performed in parallel. The scope of the invention is defined by the following claims and their equivalents.

What is claimed is:

1. A method of measuring network performance parameters, comprising:
   collecting signature values associated with packets received at multiple nodes in a network, wherein the signature values comprise at least one of a hash algorithm, a message authentication code, or a cyclical redundancy checking algorithm applied to each of the packets;
   identifying appearances of a same packet at each of the multiple nodes based on the collected signature values; and
   determining one or more network performance parameters based on the identified appearances of the same packet at each of the multiple nodes and network topology information.

2. The method of claim 1, wherein a timestamp is associated with each of the signature values.

3. The method of claim 2, wherein determining the one or more network performance parameters is further based on the time stamps associated with each of the signature values.

4. The method of claim 1, wherein the network performance parameters comprise quality of service parameters.

5. The method of claim 4, wherein the quality of service parameters comprise end-to-end delay and delay variance parameters.

6. The method of claim 1, wherein the one or more network performance parameters comprise packet loss rates.

7. A system for measuring network performance parameters, comprising:
   a plurality of network nodes, each one of the network nodes configured to:
   calculate signature values for packets received at each network node to produce calculated signature values, each one of the calculated signature values comprising an identifier for a corresponding packet, wherein the calculating comprises:
      applying at least one of a hash algorithm, a message authentication code, or a cyclical redundancy checking algorithm to each of the received packets; and
   at least one collection agent configured to:
      collect the signature values from the plurality of network nodes,
      identify appearances of a same packet at each of the plurality of network nodes based on the collected signature values, and
      determine one or more network performance parameters based on the identified appearances of the same packet at each of the plurality of network nodes and network topology information.

8. The system of claim 7, wherein each of the plurality of network nodes is further configured to:
   time-stamp each one of the calculated signature values to produce time stamps associated with each one of the calculated signature values.

9. The system of claim 8, wherein the collection agent is further configured to:
 determine the one or more network performance parameters based on the timestamps associated with each one of the calculated signature values.

10. The system of claim 7, wherein the one or more network performance parameters comprise quality of service parameters.

11. The system of claim 9, wherein the quality-of-service parameters comprise end-to-end delay and delay variance parameters.

12. The system of claim 7, wherein the one or more network performance parameters comprise packet loss rates.

13. A method of measuring a packet loss rate across a network connected to other networks via gateways, comprising:
 identifying one or more ingress and egress links of the network that connect to the other networks via the gateways;
 determining first signatures of packets entering the network via the one or more ingress links;
 determining second signatures of packets leaving the network via the one or more egress links;
 comparing the determined first and second signatures to identify packets entering the network that do not leave the network; and
 determining the packet loss rate based on the comparison.

14. The method of claim 13, further comprising:
 time-stamping each of the determined first and second signatures to produce timestamps associated with each of the determined first and second signatures.

15. The method of claim 14, wherein determining the packet loss rate is further based on the timestamps associated with each of the determined first and second signatures.

16. A system of measuring a packet loss rate across a network connected to other networks via gateways, comprising:
 at least one collection agent configured to:
  identify one or more ingress and egress links of the network that connect to the other networks via the gateways,
 one or more first network nodes configured to:
  determine first signatures of packets entering the network via the one or more ingress links;
 one or more second network nodes configured to:
  determine second signatures of packets leaving the network via the one or more egress links; and
 the at least one collection agent further configured to:
  receive the first signatures of packets from the one or more first network nodes,
  receive the second signatures of packets from the one or more second network nodes,
  compare the received first and second signatures to identify packets entering the network that do not leave the network, and
  determine the packet loss rate based on the comparison.

17. A method comprising:
 calculating signature values for packets received at a node of multiple nodes in a network, each of the signature values comprising an identifier for a corresponding packet;
 timestamping each of the received packets to produce a timestamp value associated with each packet;
 logging the calculated signature values and the timestamp values;
 sending a block of the calculated signature values and associated time stamps to a collection agent across the network; and
 correlating, at the collection agent, appearances of a same packet of the packets at the multiple nodes in the network using the block of the calculated signature values and associated time stamps, wherein the multiple nodes do not include the collection agent.

18. The method of claim 17, wherein the signature values comprise at least one of hash values, message authentication codes, or cyclical redundancy checking values.

19. The method of claim 17, further comprising:
 generating additional signature bits for each received packet; and
 determining whether the additional signature bits meet a specified criteria.

20. The method of claim 19, wherein logging the calculated signature values and the timestamp values is based on the determination whether the additional signature bits meet the specified criteria.

21. The method of claim 17, further comprising:
 deleting logged signature values based on the timestamp values.

22. A method, comprising:
 collecting, from a plurality of nodes in a network, signatures associated with packets received at the plurality of nodes;
 identifying appearances of identical ones of the packets at multiple, different ones of the plurality of nodes by comparing the signatures associated with the packets; and
 ascertaining a parameter associated with a performance of the network based on the identified appearances and network topology information.

23. The method of claim 22, further comprising:
 collecting timestamps associated with each of the packets received at the multiple nodes.

24. The method of claim 23, further comprising:
 ascertaining the parameter based on the time stamps associated with each of the packets received at the multiple nodes.

25. The method of claim 22, wherein the parameter comprises a quality of service parameter.

26. The method of claim 25, wherein the quality-of-service parameter comprises an end-to-end delay or delay variance parameter.

27. The method of claim 22, wherein the parameter comprises a packet loss rate.

28. A method, comprising:
 receiving, from a plurality of nodes in a network, signatures associated with packets received at the plurality of nodes, wherein the signatures comprise at least one of a hash algorithm, a message authentication code, or a cyclical redundancy checking algorithm applied to at least a portion of each of the packets; and
 identifying appearances of identical ones of the packets at multiple, different ones of the plurality of nodes by comparing the signatures associated with the packets.

* * * * *